UNITED STATES PATENT OFFICE.

PHYLANDER DANIELS, OF JACKSON CITY, MICHIGAN.

IMPROVEMENT IN ARTIFICIAL STONE.

Specification forming part of Letters Patent No. 136,904, dated March 18, 1873.

*To all whom it may concern:*

Be it known that I, PHYLANDER DANIELS, of Jackson City, in the county of Jackson and State of Michigan, have invented a new and Improved Artificial Stone, of which the following is a specification:

The object of my invention is to furnish an artificial stone or pavement which combines strength and durability, and offers, by its fire-proof qualities, protection against the danger arising from the too rapid spread of fire. My invention consists in the use of a solution of glue, isinglass, soluble glass, and concentrated ley; or certain combination of two or more of these ingredients in suitable proportion, dissolved in water for the purpose of cementing together particles of sand, cement, and pommeled glass, producing thereby a hard, durable, and fire-proof stone, which may be molded and applied to useful and ornamental purposes.

To obtain the cementing solution it has been found best to prepare the same in the following manner and proportions: Boil in two gallons of water one pound of concentrated ley until dissolved. Add to it one-quarter pound of dissolved glue and one-quarter pound of isinglass. Mix with it, when cooled, from one to twelve ounces of soluble glass, according to the purposes for which the stone is to be used.

The proportions of these ingredients may be varied, as to strength or quantity, so as to obtain thereby a variety of quality of the stone suitable for the different applications of the same.

This solution is applied to a mixture of two-thirds of sand, one-third of Portland cement, and, to each cubic foot, or one hundred and forty-two pounds thereof, half a pound of pommeled glass. This mixture is well dampened with the solution till it forms a pasty mass of the consistency of mortar; and may be formed and well tamped into molds, where it will soon harden, to be taken out and exposed to the air to dry. It may also be laid in the form of a fire-proof pavement, or any other suitable purpose.

A hard, compact, durable material is obtained, which will fully answer all the requirements, with the advantage that the materials composing the same can anywhere readily be obtained.

Having thus described my invention, I claim as new and desire to secure by Letters Patent—

1. The solution as prepared from ley, glue, isinglass, and solution of glass, in connection with the suitable mixture of sand, cement, and pommeled glass, substantially as and for the purpose described.

2. The process of making artificial stone by means of the solution and other materials, as described.

PHYLANDER DANIELS.

Witnesses:
MARVIN MYERS,
EMERGINE P. DANIELS.